United States Patent [19]

Miyazaki et al.

[11] Patent Number: 4,755,686
[45] Date of Patent: Jul. 5, 1988

[54] ELECTRON BEAM IRRADIATION APPARATUS

[75] Inventors: Satoshi Miyazaki; Hironori Muraki; Teruo Araki, all of Osaka, Japan

[73] Assignee: Sumitomo Electric Industries, Ltd., Osaka, Japan

[21] Appl. No.: 925,105

[22] Filed: Oct. 29, 1986

[30] Foreign Application Priority Data

Oct. 31, 1985 [JP] Japan .............................. 60-246084

[51] Int. Cl.⁴ .............................................. G21G 1/10
[52] U.S. Cl. ............................. 250/492.3; 250/492.1
[58] Field of Search ................ 250/492.3, 442.1, 398, 250/492.2, 492.1, 492.24, 492.23, 453.1; 378/69

[56] References Cited

U.S. PATENT DOCUMENTS 3,916,204 10/1975 Swartz .............................. 250/492.3

Primary Examiner—Carolyn E. Fields
Assistant Examiner—John A. Miller
Attorney, Agent, or Firm—Wenderoth, Lind & Ponack

[57] ABSTRACT

An apparatus for irradiating electron beams to treat a linear material such as an electric wire is proposed which has a plurality of pulley units for feeding the linear material wound therearound and a plurality of drive devices for each of the pulley units. The pulley units are movable in the direction of the axis of the pulleys over a sufficient distance to move the material into and out of an electron beam irradiation zone. At least one of the pulley units is positioned in the electron beam irradiation zone.

2 Claims, 2 Drawing Sheets

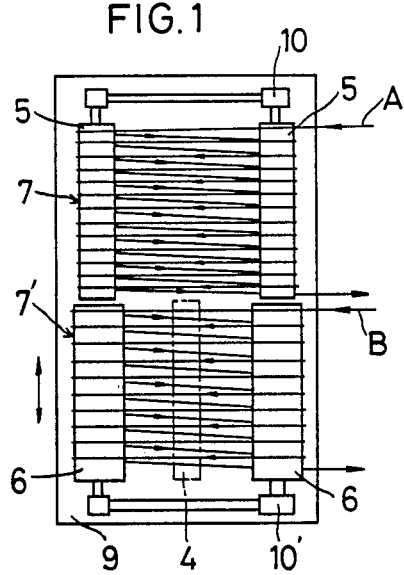
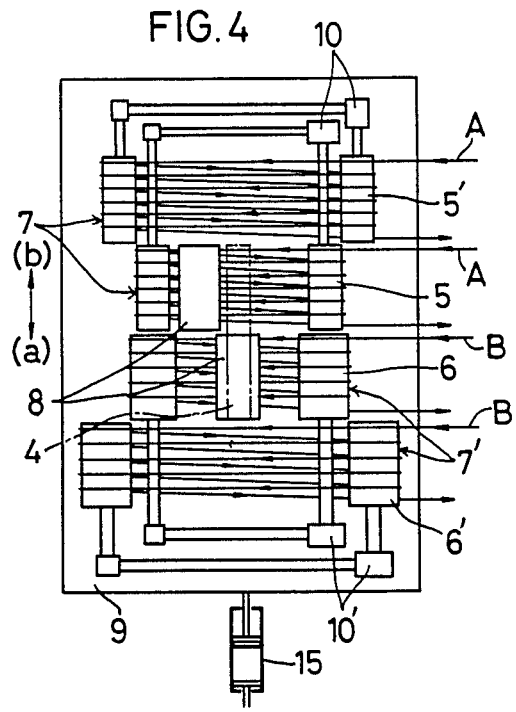
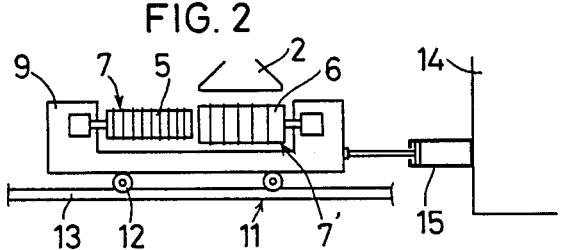
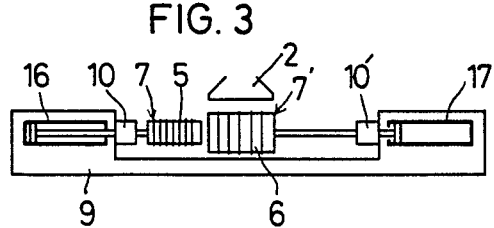

ELECTRON BEAM IRRADIATION APPARATUS

BACKGROUND OF THE INVENTION

Field of the Invention

The present invention relates to an electron beam irradiation apparatus for treating linear material such as wires e.g. electrical wire, cords and tubes, with electron beams and, particularly to a technique for increasing the work efficiency of an apparatus having a large capacity.

Recently, with the advent of an electron beam accelerator having a high output, for an electron beam radiation apparatus a demand for efficiently treating linear material having various sizes by means of a single accelerator is increasing.

Hitherto, a method has been adopted to provide a plurality of pulley units each having pulleys having a specified size suited to the object to be treated and to replace the pulley units according to the change in size of the object to be treated. This method not only requires a long time delay for replacing the pulley units, but also requires a large investment to provide a lot of pulleys. To solve this problem, apparatuses as shown in FIGS. 5 and 7 in which the irradiation region is divided into two parts is often being used recently.

In FIGS. 5 and 6, a first conventional apparatus of the type described above is shown. It comprises pulley units 7,7' placed in juxtaposition and having a pair of pulleys 5,5 and a pair of pulleys 6,6 which are different in diameter according to different wire sizes of the objects A, B. Each of the pulleys units is placed in each of the divided portions of an irradiation zone 4 (divided into two parts in FIG. 5) irradiated by electron beam 3 which is accelerated and emitted through a window 2 by an electron beam accelerator 1. On the other hand, FIGS. 7 and 8 show another conventional apparatus which is provided with devices 8 such as a beam shutter for interrupting electron beams in order to interrupt the irradiated electrom beam for each divided portion. In these figures, 9 indicates a frame for the pulley units and 10, 10' indicate the drives for the pulley units 7,7'.

The apparatus shown in FIGS. 5 and 6 has a disadvantage in that when there is no longer an object in one divided zone, the whole apparatus has to be stopped, sacrificing the work efficiency. In order to avoid this, it was necessary to control the production resulting in complicating the material flow to balance the work load in each of the divided zones.

With the apparatus shown in FIGS. 7 and 8, when there is no object in one of the divided zones, the whole apparatus may not be stopped by interrupting the electron beams irradiated thereto. But, this cannot avoid the decrease in the work efficiency of the entire apparatus.

SUMMARY OF THE INVENTION

An object of the present invention is to provide an electron beam irradiation apparatus for treating a linear material which obviates the above-mentioned shortcomings.

In accordance with the present invention, there is provided an electron beam irradiation apparatus for irradiating electron beams to treat linear material such as an electric wire with the electron beams, the apparatus comprising a plurality of pulley units each having a pair of pulleys disposed in parallel with each other for feeding the linear material wound therearound, a plurality of drive means each provided for each of the pulley units to drive the pulleys, the pulley units being juxtaposed so that their pulleys will be disposed end to end in the direction of the axis of the pulleys, and being mounted so as to be movable in the direction of the axis of the pulleys over a sufficient distance into and out of an electron beam irradiation zone, at least one of the pulley units being positioned in the electron beam irradiation zone.

Other objects and features of the present invention will become apparent from the following description taken with reference to the accompanying drawings, in which:

BRIEF DESCRIPTION OF THE DRAWINGS

FIG. 1 is a plan view of the first embodiment of the present invention;

FIGS. 2 and 3 are side views showing two examples of the position changing means;

FIG. 4 is a plan view of the second embodiment;

DETAILED DESCRIPTION OF THE PREFERRED EMBODIMENT

The embodiments according to the present invention are shown in FIGS. 1-4.

An electron beam irradiation apparatus shown in FIG. 1 is adapted to introduce one of the objects A, B having different sizes into an irradiation zone 4 to be treated. Because the side view of the apparatus is similar to that of the prior art shown in FIG. 6, it is omitted.

Figure 5:
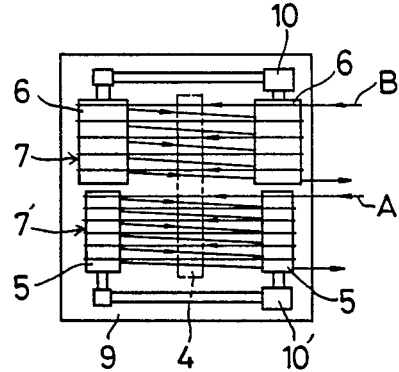
FIG. 5 is a plan view of a prior art irradiation apparatus.
Figure 6:
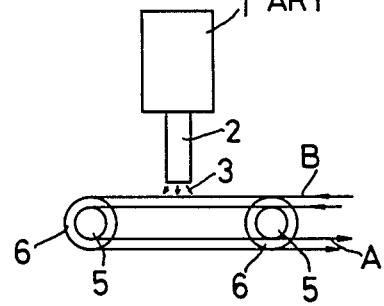
FIG. 6 is a side view thereof.
Figure 7:
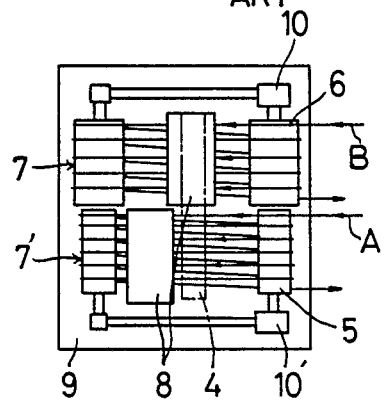
FIG. 7 is a plan view of another prior art irradiation apparatus.
Figure 8:
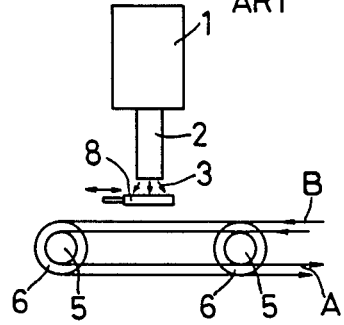
FIG. 8 is a side view thereof.

The apparatus comprises a frame 9, and pulley units 7,7' having a pair of pulleys 5,5 and a pair of pulleys 6,6, respectively. The pulleys are disposed end to end in the axial direction of the pulleys. The pulleys 5,5 and the pulleys 6,6 have different diameters. Wires may be wound around the pulleys across the paired pulleys either so as not to be parallel to each other as shown in FIGS. 6 and 8 or so as to cross each other.

These pulley units 7,7' are separately driven by means of drives 10,10' and one of them is disposed at a position corresponding to the irradiation zone 4. In the embodiment of FIG. 1, the electron beam emitted from an electron beam accelerator irradiates only the object B stretched between two pulleys 6,6' of the lower pulley unit 7' and passing through the zone 4 as the pulleys 6 unit 7' rotate. It irradiates only the object A when the position of two pulley units is changed so that the object A fed by the other pulley unit 7 enters the irradiation zone 4.

Their positions can be changed by shifting the pulley units 7,7', separately or together with the frame, in the directions of the arrow in FIG. 1.

FIGS. 2 and 3 show two examples of means for changing the position of the pulley units to perform the above-mentioned shifting mechanically.

In FIG. 2, a position changing means 11 comprises rundles 12 mounted on the the bottom of the frame 9, rails 13 for guiding the rundles 12 in the axial direction of the pulleys 5 and 6, and a cylinder 15 which extends in the same direction as the rails 13 and has one end secured to a fixed object 14 and has the other end secured to the frame 9. The reciprocating motion of a ram of the cylinder moves the frame 9 so that one of the two pulley units 7 will enter the irradiation zone 4.

With regard to the position changing means shown in FIG. 3, two cylinders 16, 17 are secured to the frame 9 at opposite ends of the frame so that each pulley unit 7 is separately movable into the irradiation zone by the reciprocating motion of cylinder rams.

Means for driving the pulley units separately or the pulley unit with the frame are not limited to cylinders. Other known means may be used such as motors, linear rails and the combination of a ball screw and a motor.

With the apparatus for irradiating electron beam shown in FIG. 1, the treatment ratio between the object A and the object B can be changed between 1:0 and 0:1 by changing the positions of the pulley units 7,7'.

FIG. 4 shows another embodiment in which the irradiation zone 4 is divided into two parts. Its side view is substantially the same as that of the prior art apparatus shown in FIG. 8. The apparatus for electron beam irradiation according to the second embodiment comprises four pulley units 7,7' juxtaposed in the axial direction of the pulleys, and among them, two inner units are placed at the position corresponding to the irradiation zone 4. Each pulley unit 7,7' has its own drive 10,10' so as to be driven separately. The pulleys 5,5' of the upper two pulley units 7 have the same diameter and the pulleys 6,6' of the lower two pulley units 7' have the same diameter. The object A is wound around the pulleys 5,5' and the object B having a size that is different from that of object A is wound around the pulleys 6,6'.

Furthermore, the irradiation zone 4 is divided in two parts and a device 8 for interrupting the electron beam is provided for each part. The numeral 15 designates a cylinder as the position changing means which is the same as that in FIG. 2.

If the devices 8 for interrupting the electron beam operate in neither of the two parts, the treatment ratio of the object A to the object B will be 1:1, when the pulley units 7,7' are positioned as shown in FIG. 4. But, it will be 2:0 when the frame 9 is moved in the direction (a) which moves the pulleys 5' into the irradiation zone 4 and which moves the pulleys 6 out ot it. Also, it will be 0:2 when the frame 9 is moved in the direction (b) in which direction the pulleys 6,6' will enter the irradiation zone. In addition, the devices 8 for interrupting the electron beam eliminate the need for stopping the accelerator to discontinue operation even though there is no object in one of the irradiation parts.

Either of the two embodiments can average the variations in load, i.e. differences in throughput between the objects having different sizes, by changing the treatment ratio and thus preventing the work efficiency of the accelerator from diminishing.

Although in the second embodiment the pulleys having the same diameter are combined, the pulleys having different diameters may be combined. Although in the present invention one pair of pulleys is taken into the irradiation zone while another pair of pulleys is taken out of it, two or more pairs may be introduced into it. Introduction and withdrawal may be performed in any desired pattern. For example, one pair of pulleys 1 meter wide may be introduced into it while two pairs of pulleys 0.5 meter wide are taken out ot it. Also, introduction may be performed separately from withdrawal, i.e. not at the same time.

As described above, the apparatus according to the present invention can withdraw, manually or by means of the position changing means, at least one of the pulley units from the irradiation zone, while moving thereinto another pulley unit loaded with an object having a different size. Therefore, this can render it unnecessary for an operator to enter the irradiation room to replace one pulley unit with another one. This can also shorten considerably the setup time for a change in the size of the object to be treated. For example, about one hour required with the conventional apparatus can be reduced to about 5 minutes.

In addition, the present apparatus can compensate for the variations in load among the pulley units due to differences in throughput between the objects having different sizes by changing the treatment ratio. The work efficiency of the installation and of the accelerator can be increased, lowering the production cost.

Moreover, the apparatus having a device for interrupting the electron beam for each divided irradiation zone allows the operation to continue even when there is no object passing through one divided zone.

What we claim is:

1. An electron beam irradiation apparatus for treating linear material with electron beams, said apparatus comprising:

an electron beam accelerator means for emitting electron beams, the emitted electron beams collectively defining an irradiation zone;

a plurality of pulley units, each of said pulley units comprising a pair of pulleys extending parallel to one another and around which the linear material is to be wound for supporting the linear material, and said pulley units being disposed end to end in the direction of the rotational axes of the pulleys;

a plurality of drive means each of which is operatively connected to a respective one of said pulley units for rotating the pair of pulleys thereof to feed the linear material; and a position changing means operatively connected to said plurality of pulley units for positioning the pulleys of each of said pulley units with respect to the irradiation zone and for selectively moving said pulley units in a direction extending parallel to the rotational axes of the pulleys between a plurality of positions, each of said positions being one at which at least one of the pairs of pulleys of said plurality of pulley units assumes an irradiation position at which the linear material supported by said at least one of the pairs pulleys is in the irradiation zone and and at least another of said pairs of pulleys is in a non-irradiation position at which said at least another of said pairs of pulleys is out of the irradiation zone.

2. An electron beam irradiation apparatus as claimed in claim 1, wherein each of said positions to which said pulley units are selectively moved by said position changing means is a position at which at least two of said pairs of pulleys assume said irradiation position, and further comprising an electron beam interrupting means selectively movable over the irradiation zone between a first position at which the interrupting means blocks the electron beams to which one of said at least two of the pairs of pulley are exposed and a second position at which the interrupting means blocks the electron beams to which the other of said at least two of the pairs of pulleys are exposed.

* * * * *